United States Patent Office 3,641,085
Patented Feb. 8, 1972

3,641,085
OXIDATION OF ALUMINUM ALKYLS
Allan J. Lundeen and James E. Yates, Ponca City, Okla., assignors to Continental Oil Company, Ponca City, Okla.
No Drawing. Filed May 1, 1969, Ser. No. 821,073
Int. Cl. C07f 5/06
U.S. Cl. 260—448 AD                    5 Claims

ABSTRACT OF THE DISCLOSURE

In the oxidation of aluminum alkyls in the preparation of alcohols via aluminum chemistry, higher quality and yields of desired alcohol are obtained if the rate of oxidation is materially reduced when the oxygen in the oxidation reactor approaches the maximum allowable and continuing the oxidation to substantial completion at the lower rate of oxygen flow.

BACKGROUND OF THE INVENTION

For a number of years now it has been known to produce alcohols by what is now known as aluminum chemistry. The over-all process includes the production of a metal alkyl, commercially aluminum trialkyls; growing the alkyls with an olefin, generally ethylene; oxidizing the growth product and hydrolyzing the oxidizing growth product with water or aqueous acid to produce the alcohol. The usual starting aluminum alkyl is aluminum triethyl and the alcohols produced are primarily even carbon normal 1-ols of $C_2$ to $C_{30}$ following a Poisson distribution. If odd carbon alcohols are desired, the starting material will usually be tripropylaluminum. Various schemes for altering the Poisson distribution have been proposed wherein the aluminum alkyl for growth may be greater than aluminum triethyl or tripropyl. The olefin used for growing is generally always ethylene since, as the chain length of the olefin increases, the tendency is to dimerize, and no further addition takes place without very carefully controlled conditions. In the oxidation step, either pure oxygen or air will generally be employed with air being the most generally employed oxidation agent. During the oxidation step certain precursors of carbonyl and diol formations are produced; and a number of proposals for minimizing such formations, such as low molecular weight aluminum trialkyls and trialkoxides as well as other inhibitors, notably titanium compounds, have been made. These methods are not pertinent to the instant invention except to the extent that they may be employed with the present invention.

In the oxidation step, it has been necessary to cease oxidation prior to completion of the reaction when the oxygen in the effluent from the oxidation reaction vessel reached about 8 percent since an oxygen content much greater than this becomes an explosion hazard.

SUMMARY OF THE INVENTION

We have found that if the rate of oxygen input to the reaction vessel is materially reduced when the $O_2$ in the effluent reaches about 8 percent, the oxygen content falls off; and the reaction can be continued to substantial completion at this reduced rate until the effluent oxygen content again reaches the critical upper limit. In a preferred embodiment, the oxygen input rate is reduced to about ½ of the normal rate at a first peak and then cut ½ again until the peak is again reached.

DETAILED DESCRIPTION OF PREFERRED EMBODIMENT

As has been indicated, this invention is useful in oxidation of aluminum alkyls generally. In most cases, the oxidation will be on growth product, that is, the aluminum alkyls prepared by reacting an olefin, particularly ethylene, with a low molecular weight aluminum trialkyl which has had unreacted ethylene after which the low boiling impurities are removed by distillation. Typically, the growth product will be in solution in a paraffin hydrocarbon such as kerosene.

In carrying out the oxidation, the oxygen is introduced into the oxidation vessel, generally as air, at as high a rate as can be tolerated without excessive temperature rise. According to our invention, the initial oxidation will be continued at the desired rate of oxygen flow until the oxygen in the effluent from the oxidation reaction reaches the maximum allowable concentration. We prefer to not let the oxygen level in the effluent exceed about 8 percent, although other maximum limits may be acceptable to others. In any case, it is hazardous to permit the oxygen level to rise much over about 10 percent, and we prefer the additional 2 percent lower level as a safety factor. Still others may establish an even lower maximum; but, to the best of our knowledge, the commercial production of alcohols by aluminum chemistry uses the 8 percent level. As the oxygen approaches our upper limit, we reduce the rate of oxygen input to about ½ of the initial rate. The oxygen in the effluent will be sharply reduced and will then begin to climb again. When the oxygen content of the effluent again approaches the maximum allowable, the reaction can be shut down; however, as it takes only a very short time, we prefer to reduce the rate again by ½ and let the effluent oxygen content again reach the maximum allowable. It will be apparent to those skilled in the art that the ½ reduction in rates is arbitrarily chosen, and any material reduction in rate will suffice. For most efficient operations we prefer a reduction to between 33 and 66 percent of the initial rates. We have found that the build-up of oxygen in the effluent after the first cutback requires very little additional time, and therefore prefer a first cutback to ½ of the original rate and a second cutback to ¼ of the original rate. However, as will be seen from the run described below, the second cutback is not necessary in most cases, but we use it in order to insure maximum oxidation.

Example

To illustrate the invention, a plant run was made wherein about 8,000 gallons of growth product solution was oxidized in the oxidation vessel. The solution was about ⅔ weight growth product and ⅓ kerosene. The oxidation was carried out in the presence of 0.14 weight percent Ti/Al. The initial flow of air was about 1,000 std. ft. ³/min. and was continued until the oxygen in the air effluent reached 8 percent. At this time the rate was cut to 500 std. ft. ³/min. and the $O_2$ level declined sharply. The rate at 500 ft. ³/min. was continued until the $O_2$ in the effluent again reached 8 percent at which time the air rate was reduced to 250 std. ft. ³/min. Again, the $O_2$ level dropped, and this rate was continued until the $O_2$ again reached 8 percent in the effluent at which time the oxidation was shut down. The reactor conditions were about 90° F. and 40 p.s.i.g. Each time the oxygen content of the effluent reached 8 percent a sample was withdrawn and the $C_{18}$, $C_{20}$, and $C_{22}$ fractions analyzed for normal-1-alcohols. The difference is shown in the table as percent nonnormal which includes branched alcohols, diols, carbonyl products and paraffins, e.g., unoxidized material. That is, the oxidized growth product is first separated from the kerosene solvent and hydrolyzed. The hydrolyzed product was then fractionally distilled so as to recover the $C_{18}$, $C_{20}$, and $C_{22}$ fractions along with similarly boiling materials. The table also shows the total yield of $C_6$ to $C_{18}$ materials which will include the normal 1-ols of $C_6$ to $C_{18}$ as well as the nonnormals.

TABLE

| Sample No. | Percent nonnormal | | | 618 alcohol total yield, gms. alc./gm. Al |
|---|---|---|---|---|
| | 18 | 20 | 22 | |
| 1 | 6.2 | 10.8 | 19.2 | 14.2 |
| 2 | 4.8 | 8.2 | 14.0 | 14.4 |
| 3 | 4.7 | 8.2 | 13.9 | 14.4 |

From the table, it can be seen that the amount of nonnormal material is materially reduced by the practice of this invention. The reduction of nonnormal was due to more complete oxidation of the growth product.

Having thus described our invention, we claim:

1. A method of oxidizing an aluminum alkyl which comprises introducing oxygen to the aluminum alkyl at a rate approaching the maximum rate wherein the oxidation reaction can be controlled until the oxygen content of the gases leaving the reaction mass approaches a predetermined safe maximum not in excess of about 10% and thereafter reducing the rate of introducing the oxygen sharply whereby the oxygen content of the gases leaving the reaction mass is reduced and continuing the oxidation at the reduced rate until the oxygen content in the gases leaving the reaction mass again approaches the predetermined safe maximum.

2. The process of claim 1 wherein the aluminum alkyl is aluminum trialkyl and wherein the reduced rate of oxygen introduction is in the range of $\frac{1}{3}$ to $\frac{2}{3}$ of the original rate.

3. The process of claim 2 wherein the aluminum trialkyl is growth product.

4. The process of claim 3 wherein a second reduction of rate of introducing oxygen into the reaction mass is made when the oxygen content in the gases leaving the reaction mass again approaches the predetermined safe maximum.

5. The process of claim 4 wherein the second reduction of rate of introducing oxygen is $\frac{1}{3}$ to $\frac{2}{3}$ of the rate after the first reduction.

References Cited

UNITED STATES PATENTS 3,455,978 7/1969 Richardson et al. _ 260—448 AD

TOBIAS E. LEVOW, Primary Examiner

H. M. S. SNEED, Assistant Examiner